(12) United States Patent
Hung et al.

(10) Patent No.: US 8,059,843 B2
(45) Date of Patent: Nov. 15, 2011

(54) DISPLAY DEVICE WITH SOUND MODULE

(75) Inventors: Min-Hsiung Hung, Taipei Hsien (TW);
Tsung-Hsun Yang, Taipei Hsien (TW);
Shun-Lung Chiu, Taipei Hsien (TW);
Cho-Ming Wu, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 1047 days.

(21) Appl. No.: 11/934,089

(22) Filed: Nov. 2, 2007

(65) Prior Publication Data
US 2008/0159570 A1 Jul. 3, 2008

(30) Foreign Application Priority Data

Dec. 27, 2006 (CN) .......................... 2006 1 0157759

(51) Int. Cl.
*H04R 5/02* (2006.01)
*H04R 1/02* (2006.01)
*H04N 5/72* (2006.01)
*A47B 81/06* (2006.01)

(52) U.S. Cl. ......... 381/306; 381/388; 348/836; 181/199

(58) Field of Classification Search ............... 381/1, 300, 381/301, 306, 333, 337, 339, 345, 352, 386, 381/388, 395; 348/825, 826, 836; 361/679.23, 361/679.61; 181/198, 199
See application file for complete search history.

(56) References Cited

U.S. PATENT DOCUMENTS

| 5,452,025 | A | | 9/1995 | Koizumi | |
|---|---|---|---|---|---|
| 6,035,051 | A | * | 3/2000 | Sato | 381/388 |
| 6,324,052 | B1 | * | 11/2001 | Azima et al. | 361/679.23 |
| 7,652,724 | B2 | | 1/2010 | Fukano | |
| 2006/0078138 | A1 | * | 4/2006 | Wada | 381/333 |
| 2006/0187364 | A1 | * | 8/2006 | Fukano | 381/388 |
| 2006/0201739 | A1 | * | 9/2006 | Tanaami | 181/156 |

FOREIGN PATENT DOCUMENTS

| CN | 1825922 A | 8/2006 |
|---|---|---|
| EP | 0532280 A2 | 3/1993 |

* cited by examiner

Primary Examiner — Curtis Kuntz
Assistant Examiner — Jesse Elbin
(74) Attorney, Agent, or Firm — Altis Law Group, Inc.

(57) ABSTRACT

A display device includes an enclosure, a pair of speakers, and a sound reflector accommodated in the enclosure. The sound reflector defines two chambers for receiving the sounds generated from the pair of speakers respectively and outputting the sounds out of the display device independently.

20 Claims, 5 Drawing Sheets

DISPLAY DEVICE WITH SOUND MODULE

BACKGROUND

1. Field of the Invention

The present invention generally relates to display devices. More particularly, the present invention relates to a television or a monitor with a sound module arrangement.

2. Description of Related Art

Traditional cathode ray tube (CRT) televisions are being replaced by flat-panel type televisions, such as liquid crystal display (LCD) televisions, plasma display panel (PDP) televisions, etc.

A typical flat-panel type television includes a display system and a sound system. The display system has a display screen for displaying video images. The sound system includes at least a pair of speakers for outputting sounds, and a sound reflector for reflecting the sounds. The speakers are usually located at a lower side of an enclosure of the television and are mounted to the sound reflector. A long cavity is defined in the sound reflector for transmitting the sounds from the speakers to the space in front of the television. However, a part of the sounds from the different speakers interfere with each other in the long cavity, thus causing the sounds to be distorted.

Therefore, what is needed in the industry is to provide a display device with a sound module, which can improve the audio effect.

SUMMARY

Accordingly, a display device is provided. The display device includes an enclosure, a pair of speakers, a sound reflector, and a suppressing member. The speakers and the sound reflector are accommodated in the enclosure. The speakers are supported on the sound reflector. The sound reflector defines two independent chambers for receiving the sounds generated from the speakers and outputting the sounds out of the display device. The two chambers are separated by the suppressing member for preventing the sounds transmitting from one speakers from entering into the other chamber for improving an audio effect.

DETAILED DESCRIPTION

Reference will now be made in detail to the preferred embodiments of the display device, examples of which are illustrated in the accompanying drawings.

Figure 1:
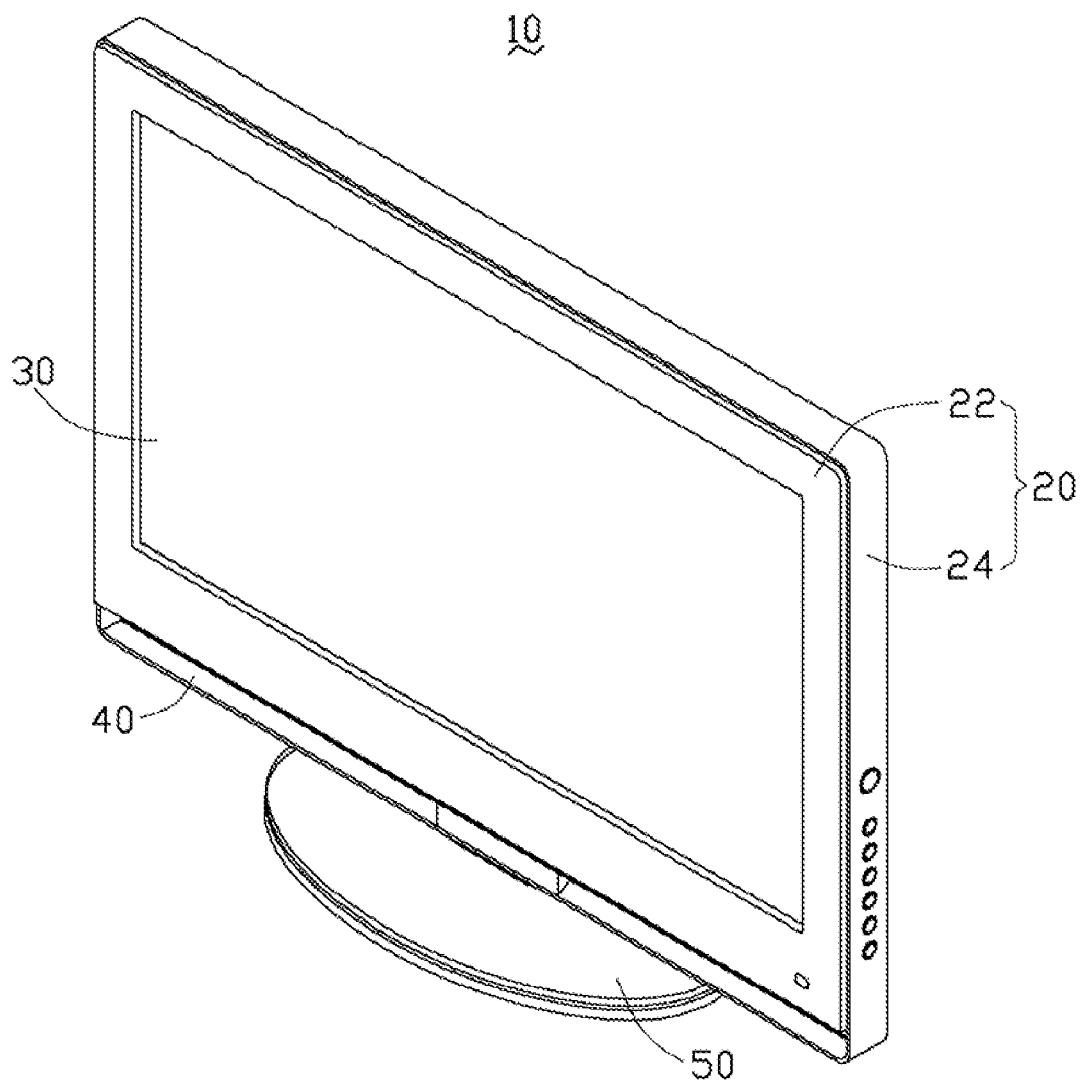
FIG. 1 is an isometric view of a display device with a sound module in accordance with an embodiment.
Figure 2:
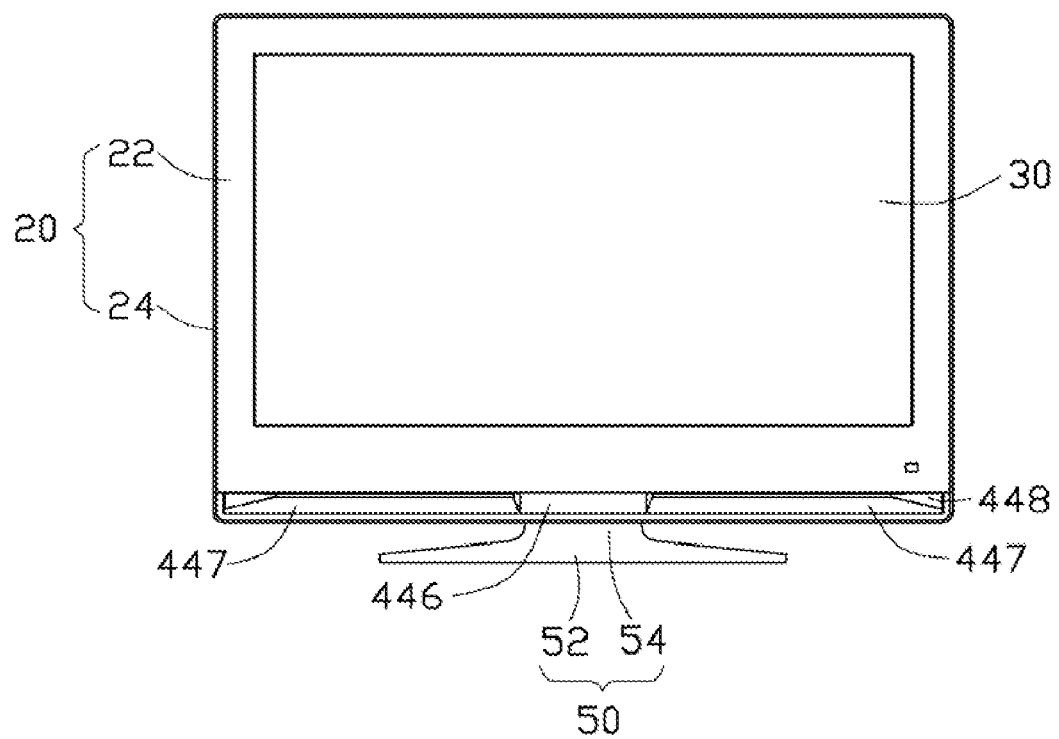
FIG. 2 is a front view of the display device with a sound module in FIG. 1.

Referring to FIG. 1 and FIG. 2, a display device 10, for example, an LCD television includes an enclosure 20, a display screen 30, a sound module 40, and a stand 50. The display screen 30 and the sound module 40 are accommodated in the enclosure 20. The enclosure 20 is connected to the stand 50.

The display screen 30 is configured for displaying video images. The sound module 40 is configured for outputting sounds in a reflecting fashion. The sound module 40 is disposed at a lower portion of the enclosure 20 adjacent to the stand 50. As depicted in FIGS. 1 & 2, when viewed from the front of the display screen 30, the sound module 40 is located underneath the display screen 30. It should be noted that in alternative embodiments the sound module 40 can also be disposed above, on the left, or on the right of the display screen 30.

The stand 50 includes a base 52 and an elongated neck 54. The enclosure 20 is connected to an upper portion of the elongated neck 54. The base 52 is coupled to a lower portion of the elongated neck 54 for supporting the enclosure 20 on a supporting surface such as a table or a desk.

The enclosure 20 includes a front cover 22 and a rear cover 24. The front cover 22 and the rear cover 24 are assembled together to secure the display screen 30 in the enclosure 20. The front cover 22 has a smaller size than that of the rear cover 24 in a substantially up-down direction, to expose the sound module 40 when viewed from the front of the television 10. A substantially rectangular opening (not labeled) is defined in an approximately central portion of the front cover 22 for viewing the video images on the display screen 30.

Figure 3:
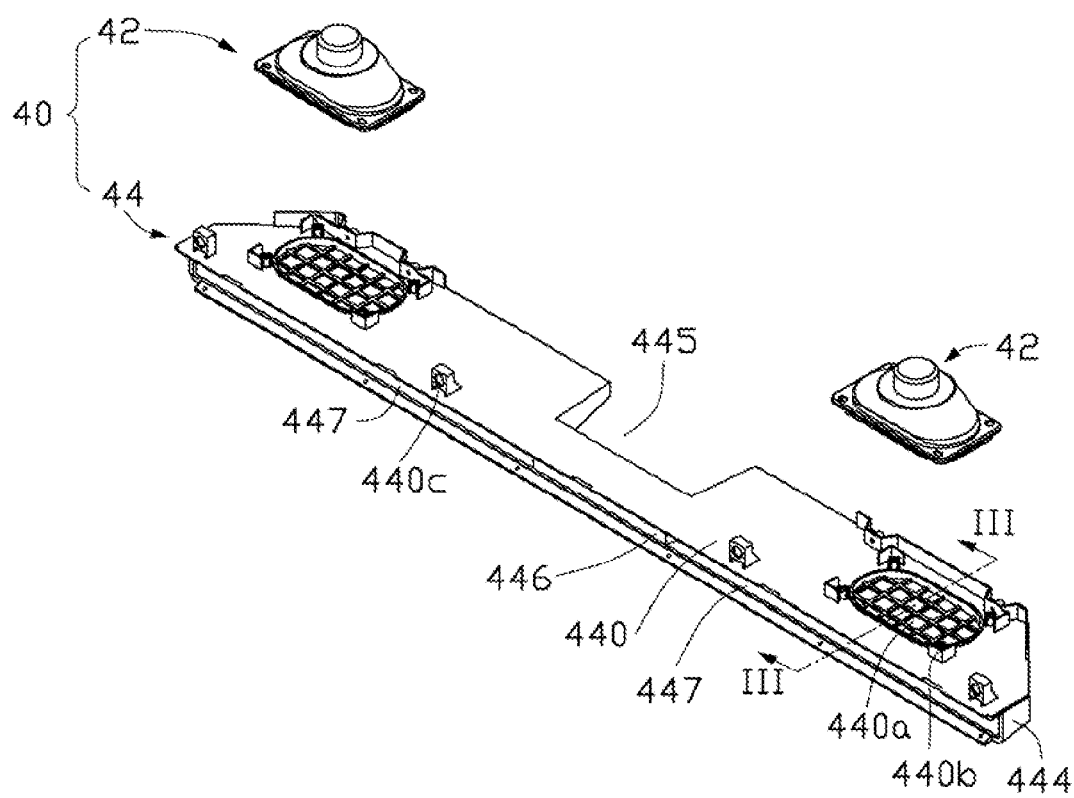
FIG. 3 is an exploded and isometric view of the sound module with a sound reflector in FIG. 1.
Figure 4:
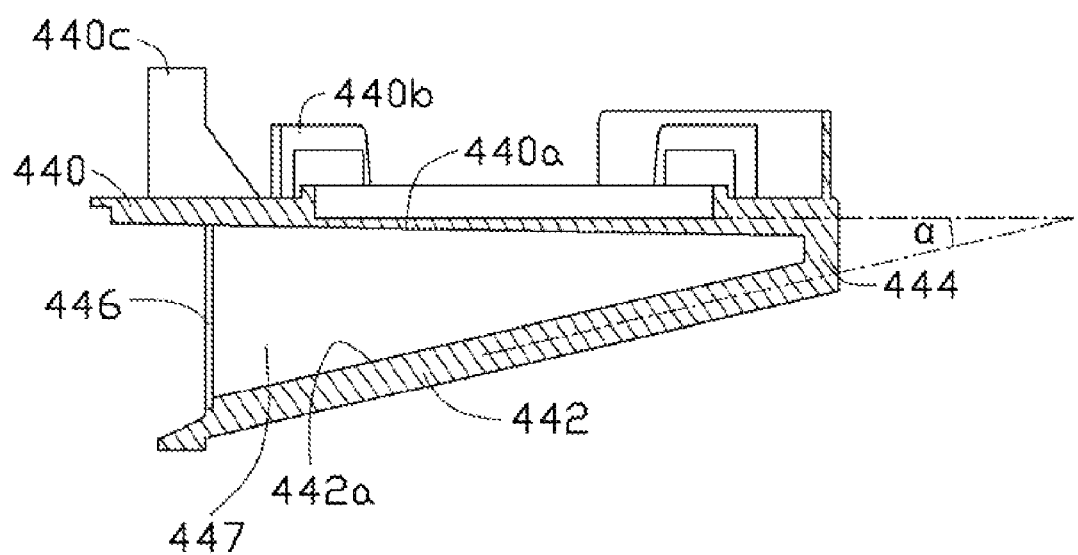
FIG. 4 is sectional, side view of the sound reflector along a line III-III in FIG. 2.
Figure 5:
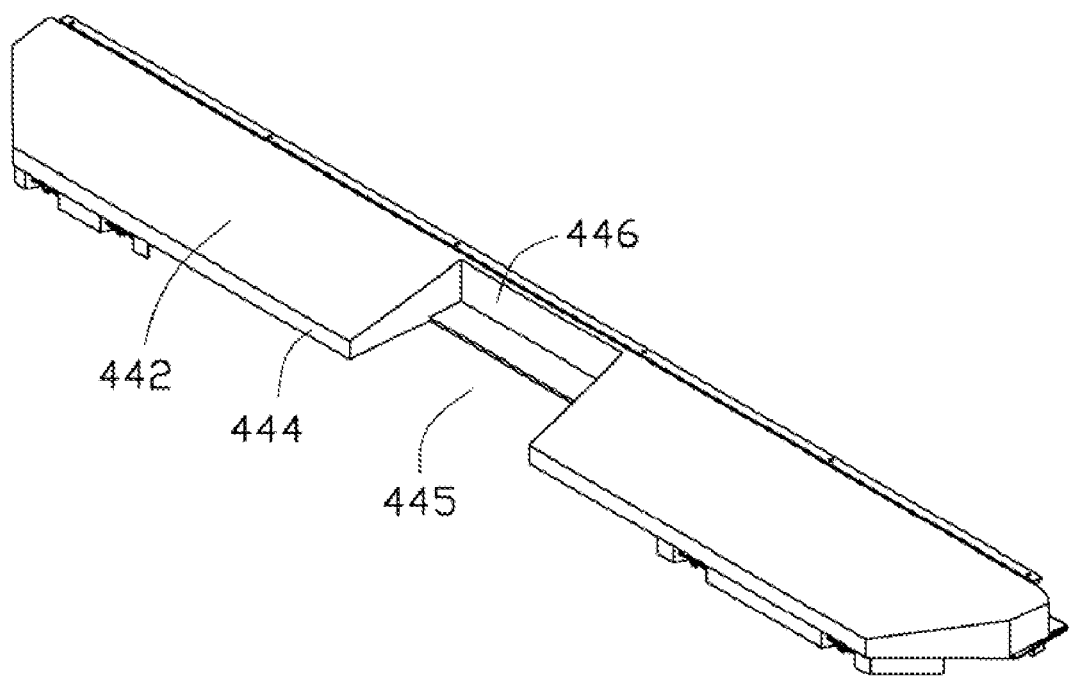
FIG. 5 is an isometric view of the sound reflector viewed from another position.

Referring to FIG. 3 to FIG. 5, the sound module 40 includes a pair of speakers 42 and a sound reflector 44. The speakers 42 are configured for generating sounds. The sound reflector 44 is configured for supporting the speakers 42, and reflecting the sounds generated from the speakers 42 to the out space of the television 10.

The sound reflector 44 includes a supporting sheet 440, a reflecting sheet 442, a connecting sheet 444, and a suppressing member 446. The supporting sheet 440 is substantially a long flat board. The supporting sheet 440 is defined with two screens 440a at opposite ends of the supporting sheet 440. Each screen 440a is formed by intercrossed bars (not labeled) extending with each other in two dimensional directions. Alternatively, the screens 440a may be formed by other members such as membrane that can transmit sounds. The screens 440a are covered by the speakers 42 respectively for receiving the sounds transmitted therefrom.

The reflecting sheet 442 is disposed obliquely with respect to the supporting sheet 440, for example, an acute angle α is formed between the reflecting sheet 442 and the supporting sheet 440. The reflecting sheet 442 includes a reflecting surface 442a facing toward the supporting sheet 440. The reflecting surface 442a extends downwardly for reflecting the sounds toward the audiences.

The connecting sheet 444 is connected with the side edges of the supporting sheet 440 and the reflecting sheet 442. A partially opened space (not labeled) is defined by the supporting sheet 440, the reflecting sheet, and the connecting sheet 444. The suppressing member 446 is disposed in the partially opened space. The partially opened space is separated into two chambers 447 by stuffing the suppressing member 446 between the supporting sheet 440 and the reflecting sheet 442. Therefore, the sounds transmitting from each of the speakers 42 into one chamber does not enter the other chamber.

Both of the supporting sheet 440 and the reflecting sheet 442 is defined with a notch 445 along one side, for allowing the elongated neck 54 of the stand 50 to extend therethrough. Therefore, when the stand 50 is mounted with the enclosure 20, a portion of the elongated neck 54 is received in the notch 45.

Additionally, the supporting sheet 440 and the reflecting sheet 442 both have two corners being cut off. Such that the connecting sheet 444 at the two corners has two inclined surfaces 448 (see FIG. 2) as viewed from the front of the television 10, thereby increasing the general appearance of the television 10. A plurality of protruding posts 440c protrudes from the supporting sheet 440 is used for fastening the sound reflector 44 to the front cover 22 and the rear cover 24. A plurality of L-shaped fixing members 440b protrudes from the supporting sheet 440. The fixing members 440 are located around the screens 440a for firmly mounting the speakers 42 with the sound reflector 44.

After assembly, the speakers 42 are firmly supported on the sound reflector 44 and covers the screens 440a respectively. The sound module 40 is mounted to the lower portion of the enclosure 20 with the speakers 42 being hidden behind a lower portion of the front cover 22. In use, the sounds are generated by the two speakers 42. The generated sounds then pass through the screens 440a, and enter into the two chambers 447 respectively. The sounds in the chambers 447 are reflected by the reflecting surfaces 442a respectively. The reflected sounds are then outputted to the out space of the television 10.

The two chambers 447 defined by the sound module 40 are separated from each other by the suppressing member 446, such that the sounds generated by the speakers 42 cannot enter into the other chamber. Thereby, the sounds perceived by the audiences have enhanced audio effect.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display device, comprising:
an enclosure;
a pair of speakers accommodated in the enclosure configured for generating sounds; and
a sound reflector accommodated in the enclosure, the sound reflector comprising a supporting sheet, a reflecting sheet and a connecting sheet for connecting the supporting sheet with the reflecting sheet; the supporting sheet, the reflecting sheet and the connecting sheet cooperatively defining an opened space;
wherein the sound reflector further comprises a suppressing member, the suppressing member is arranged between opposite ends of the supporting sheet and disposed in the opened space to separate the opened space into two chambers, the two chambers respectively receives the sounds generated from the pair of speakers and output the sounds out of the display device to prevent the sounds outputted from the speakers respectively interfering with each other.

2. The display device as claimed in claim 1, wherein the supporting sheet is configured for supporting the speakers thereon.

3. The display device as claimed in claim 2, wherein the reflecting sheet is arranged in an acute angle with respect to the supporting sheet.

4. The display device as claimed in claim 3, wherein the reflecting sheet comprises a reflecting surface facing toward the supporting sheet, the reflecting surface is configured for reflecting the sounds towards the front of the display device.

5. The display device as claimed in claim 2, wherein the display device comprises a stand, the enclosure is supported by the stand, the sound reflector is defined with a notch at a substantially central portion, the notch is configured for receiving part of the stand therein.

6. The display device as claimed in claim 2, wherein the supporting sheet is defined with two screens at opposite ends of the supporting sheet, the screens respectively communicate with the two chambers and are configured for receiving sounds transmitted from the speakers respectively.

7. The display device as claimed in claim 6, wherein a plurality of L-shaped fixing members are surrounding the screens corresponding to each speakers, the L-shaped fixing members are configured for fixing edges of each of the speakers.

8. The display device as claimed in claim 1, wherein the enclosure comprises a front cover, the sound reflector is connected with a lower portion of the front cover.

9. The display device as claimed in claim 8, wherein the speakers are hidden behind the front cover as viewed from the front of the display device.

10. The display device as claimed in claim 1, wherein the supporting sheet and the reflecting sheet both has two corners being cut off, forming two inclined surfaces as viewed from the front of the display device.

11. A display device, comprising:
a display screen configured for displaying video images thereon; and
a sound reflector arranged parallel with one direction of a plane that the video image being presented along, the sound reflector configured for outputting sounds toward audiences along with the video images being projected, the sound reflector comprising a supporting sheet, a reflecting sheet and a connecting sheet for connecting the supporting sheet with the reflecting sheet, the supporting sheet, the reflecting sheet and the connecting sheet cooperatively defining an opened space;
wherein the sound reflector further comprises a suppressing member, the suppressing member is arranged between opposite ends of the supporting sheet and disposed in the opened space to separate the opened space into at least two chambers for outputting sounds independently.

12. The display device as claimed in claim 11, further comprising at least two speakers corresponding to the at least two chambers, wherein the at least two speakers are supported on the sound reflector.

13. The display device as claimed in claim 12, wherein the speakers are concealed behind the display screen.

14. The display device as claimed in claim 12, wherein the speakers together with the sound reflector are disposed at a lower portion of the display device adjacent to a table that supports the display device.

15. The display device as claimed in claim 12, wherein the reflecting sheet is arranged at an acute angle with the supporting sheet, the reflecting sheet comprises a reflecting surface for reflecting the sounds generated from the speakers to the front of the display device.

16. The display device as claimed in claim 15, wherein the supporting sheet and the reflecting sheet both has two corners being cut off, forming two inclined surfaces as viewed from the front of the display device.

17. A display device, comprising:

two speakers configured for generating sounds, the sounds transmitting along a first direction; and a sound reflector configured for supporting the speakers thereon, the sound reflector comprising a supporting sheet, a reflecting sheet and a connecting sheet for connecting the supporting sheet with the reflecting sheet; the supporting sheet, the reflecting sheet and the connecting sheet cooperatively defining an opened space;

wherein the sound reflector further comprises a suppressing member, the suppressing member is arranged between opposite ends of the supporting sheet and disposed in the opened space to divide the opened space into two parts for independently receiving the sounds transmitted from the two speakers respectively along the first direction, and independently reflecting the sounds such that the sounds transmitting along a second direction substantially perpendicular to the first direction.

18. The display device as claimed in claim 17, wherein the reflecting sheet is arranged in an acute angle with respect to the supporting sheet.

19. The display device as claimed in claim 17, further comprising a front cover being connected to the sound reflector, the speakers are hidden behind the front cover.

20. The display device as claimed in claim 17, wherein the supporting sheet and the reflecting sheet both has two corners being cut off, forming two inclined surfaces as viewed from the front of the display device.

\* \* \* \* \*